A. Leonard,
Casting Thimble Skeins, &c.
No. 575. Reissued July 27, 1858.
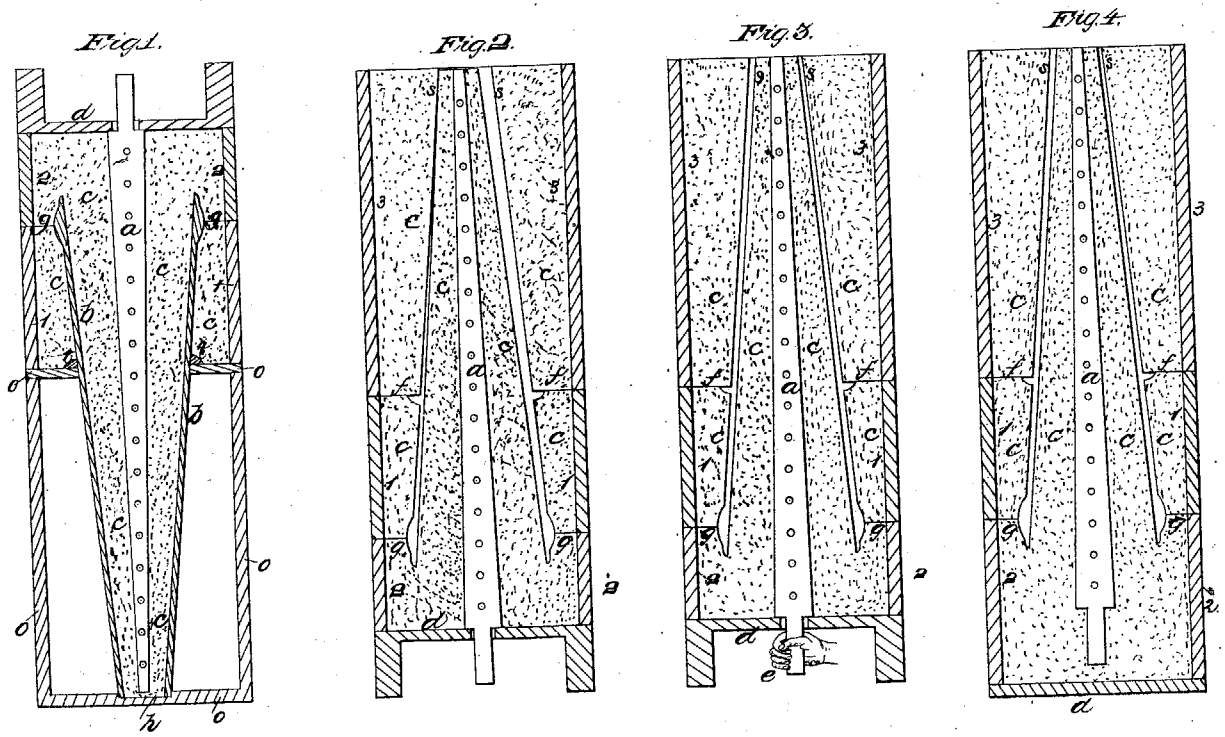
N. PETERS, PHOTO-LITHOGRAPHER, WASHINGTON, D. C.

UNITED STATES PATENT OFFICE.

A. LEONARD, OF KENOSHA, WISCONSIN.

IMPROVEMENT IN CASTING SKEINS FOR WAGONS.

Specification forming part of Letters Patent No. 16,688, dated February 24, 1857; Reissue No. 575, dated July 27, 1858.

*To all whom it may concern:*

Be it known that I, ANDREW LEONARD, of Kenosha, State of Wisconsin, have invented a new and useful improvement in the manufacture of thimble-skeins for wood axles, whereby I materially cheapen their cost, and at the same time produce a seamless skein and collar in the rough casting, possessing all the perfection in form of a turned axle when it comes from the sand, and I thereby preserve the chilled or hard surface of the iron as a wearing-surface, which reduces the friction and increases the durability of the skein; and I do hereby declare the following to be a full and clear description of the method of constructing the patterns and of arranging them in the skeleton flask, and of the process of molding and controlling the cores, so as to secure their true position in the center of their molds after the molds are completed and ready for the iron, (except putting on the cope,) reference being had to the accompanying drawings, in which—

Figure 1 is a sectional elevation of a whole pattern, *b*, inverted and sustained in a skeleton flask, *o*, in a vertical position, with a whole pattern, *t*, in a horizontal position, surrounding the vertical pattern *b* and resting on the top of the flask *o*, showing the method of combining the two whole patterns *b* and *t* as they are arranged and sustained in the skeleton flask at right angles to each other, while the collar-pattern *t* and the base of the skein-pattern *b*, together with its own core, are molded up in sections 1 and 2 of the pattern-flask, and showing also the core-bar *a*, running through the length of the core and base of the mold and bottom board, *d*, outside of the flask, as a means for adjusting the core after the mold is completed. Fig. 2 represents a sectional elevation of the mold and flask after the pattern has been reversed, molded up, and withdrawn, showing the tendency of a green-sand core to spring or incline out of its true position when sustained only at one end, and its length as great in proportion to the diameter of its base as a thimble-skein core is required to be. The top of the core is seen at *s* resting against the side of the mold, rendering it necessary that some means be had and used outside of the flask or mold for adjusting the core after the mold is completed. A practical means for effecting this adjustment is seen in Fig. 3, the core being adjusted by the hand at *c*, the cope being off the inside of the mold and the position of the core therein is readily seen and adjusted at *s*, Fig. 2, and as the base of the core is combined with the base of the mold, and therefore in its true position, it will be obvious that the top of the core may be adjusted with the hand by the aid of core-bars or by equivalents for that purpose. Fig. 4 shows the core-bar extending down into solid sand, the flask being lengthened for that purpose. The end of the bar thus molded in will afford sufficient support to the core to prevent it from springing or inclining out of the center when the pattern is withdrawn.

The nature of my invention consists in making seamless thimble-skeins from the sand by the method, substantially as described, of arranging and combining the whole patterns *b* with the loose collar-patterns *t* in the skeleton flask *o* for holding them. In combination with the process of first molding the cores from green sand in the hollow of the whole patterns *b*, and the loose collar-patterns *t* in section 1 of the flash; and, secondly, molding up section 2 of the flask, parting the sand at *g*, and forming a base for the mold, and combining the core with it, as one body of sand *c*, so that when the flask is reversed the core will form a part of and stand upon the base of the mold in a vertical position when the mold is completed, and having no other support; and it consists, also, in controlling and adjusting the upper end or top of the core at *s* to the center of their molds (the bottoms being combined with and fixed at their base with the base of the mold) by the use of long core-bars or other means, to be operated by the hand outside of the flask, either at the top or bottom, for that purpose after the patterns are withdrawn and the molds completed, except the cope.

To enable others to practice my invention with success, I refer to the drawings, in which—

Figure 1 shows a skeleton, *o*, holding an inverted hollow pattern, *b*, in a vertical position, and a loose collar-pattern, *t*, in a horizontal position surrounding the pattern *b*. I first mold up section 1 of the flask with the loose collar-pattern *t*, and parting the sand at

*g*, as well as the core in the hollow of the pattern *b*, a long core-bar, *a*, may be molded into the core, leaving one end of it standing out from the base. Section 2 of the flask should then be molded up, combining the sand with the base of the core in the pattern, as one body of solid sand, *e*, and forming a base for the mold and core to stand upon when the flask and pattern are reversed and the mold completed, as seen in Figs. 2 and 3. The core-bar *a* may be extended through the bottom board, *d*, for the purpose of adjusting the top of the core at *s* by the hand, as seen at *e*, Fig. 3. It may be either molded in or inserted after the mold is completed, (except withdrawing the pattern,) and by the use of these bars or their equivalents, to be used by the hand outside of the flask, I am enabled to insure the true position of the core, and as the bottom of the core forms a part of the base of the mold the usual risk of losing the castings are avoided. I am enabled also by the vertical position to mold a full set of wagon-skeins in one flask from whole patterns, leaving their own cores.

In withdrawing the patterns it will be seen that section 3 of the flask, with its check, lifts from the collar *t* at *f* and section 1 from the head at *g*, carrying the loose collar-pattern *t*, which may be drawn, and the pattern *b* is then wrapped and worked loose, when it is lifted from the core, leaving it in a vertical position, supported alone at its base, and it may be either with or without the core-bars; but as it is small relatively with its length, it is liable to spring or incline out of its true position in the mold, as seen in Fig. 2. The cope being off enables me, when sections 1 and 3 are returned and the mold completed, to see the core at *s*, and to adjust it, when necessary, by hand before putting on the cope. The true position of the core is thereby secured. The effect of these improvements is to secure the full realization of the object aimed at—to wit, the making of seamless thimble-skeins perfect and true, direct from the sand, constituting them a new manufacture as contradistinguished from thimble-skeins made from half-patterns having seams, as well as from those made seamless by turning them and removing the chilled surface, and the effect is also to cheapen the cost of labor in the manufacture of thimble-skeins to a degree exceeding one-half, as I am enabled to mold a full set of four skeins in one flask in nearly the same time that it requires to mold a single one from half-patterns and dry-sand cores in the old way. Besides, the quantity of sand required is reduced more than one-half, and, as they are true and seamless upon the inner surface, the labor of fitting them onto the wood axles is also much diminished.

I am aware that a turned thimble-skein is made seamless upon the outer surface, and the collar is made seamless by the same means; but in all such cases the inside surface of the skein has seams and inequalities, to which the wood-axle must be adapted by corresponding inequalities. I wish it understood that I do not claim the making of seamless thimble-skeins *per se*, or except as they are made so in the rough casting by the means and process specified; nor do I claim the molding or casting of cart boxes or bushes in a vertical position, for this has been done before, but differing from my invention.

Having thus fully described my invention and shown what I believe to be the best mode of carrying out the same, I do hereby declare that I do not claim to have been the first to make thimble-skeins as such; but

I do claim as my invention and desire to secure by Letters Patent of the United States—

1. The combination of a whole thimble-skein pattern, *b*, with a loose collar-pattern, *t*, substantially as specified, and as shown in Fig. 1, for the purpose specified.

2. The vertical position of green-sand cores for thimble-skeins when molded and combined at their base, with the mold, substantially in the manner specified, in combination with adjusting the top of the cores at *s* by the hand after the mold is completed, except the cope, whether core-bars or their equivalents for that purpose are used, substantially as described and shown.

ANDREW LEONARD.

Witnesses:
DANIEL BARNUM,
NATHAN B. HYDE.